Patented Nov. 10, 1936

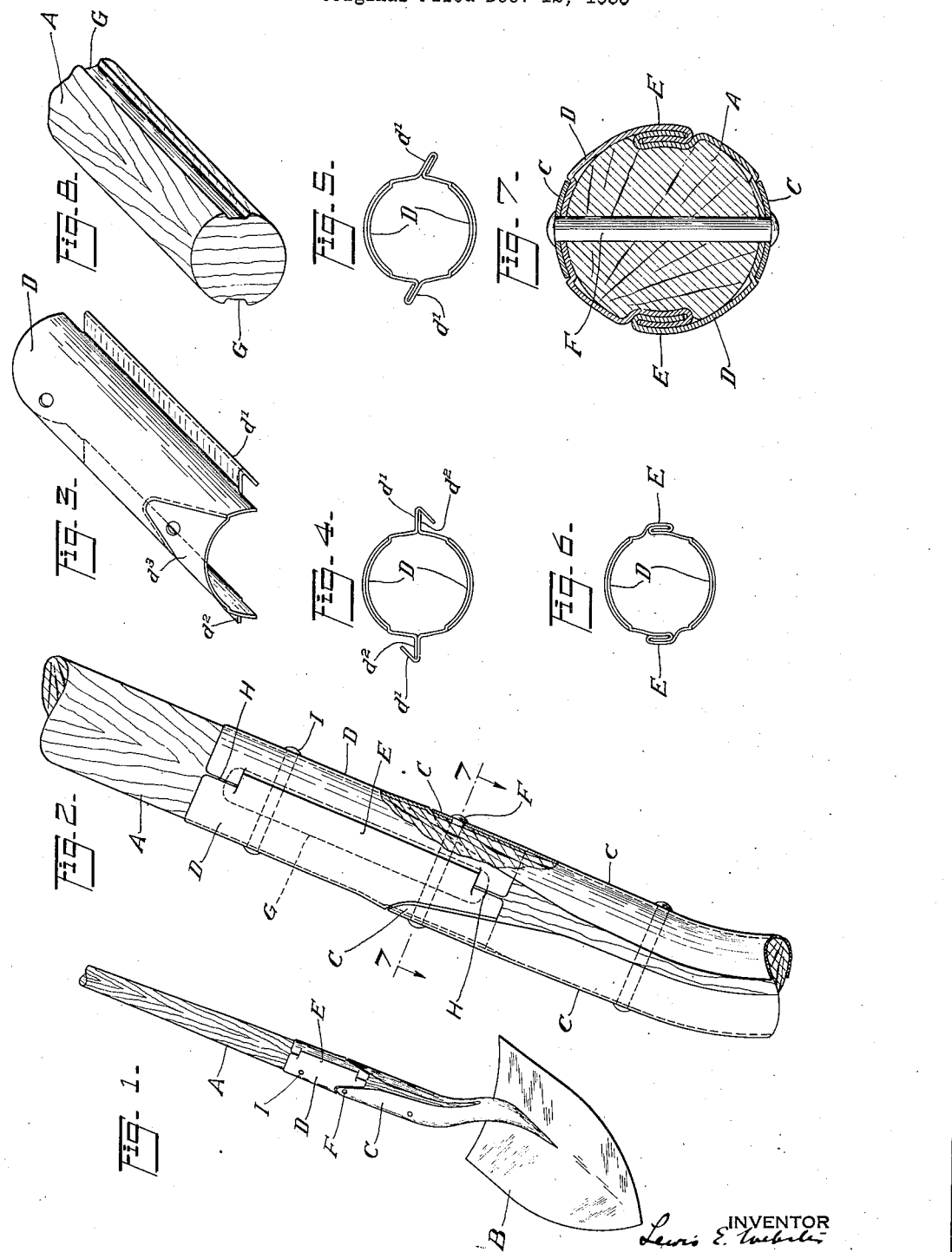

2,060,707

UNITED STATES PATENT OFFICE 2,060,707

SHOVEL OR THE LIKE

Lewis E. Webster, Wilkes-Barre, Pa.

Application December 12, 1933, Serial No. 701,946
Renewed April 15, 1936

4 Claims. (Cl. 294—57)

This invention relates to improvements in shovels and similar implements, including a stale or stem and a blade for digging and/or lifting earth or other material.

Although not so limited, the invention has particular reference to shovels and has such reference because of the heavy duty imposed upon shovels in the digging, loosening and raising of earth and other material. For these reasons the invention will be described with particular reference to shovels although, as just indicated, the invention is not to be so limited.

A shovel comprises, among other things, a stem or stale and a blade, with connections between the two comprising what is termed a socket, consisting of two leaf-like straps integral or otherwise connected with the blade, as by riveting or welding, and extending upwardly along the shovel stale or stem.

The two leaf-like members of this socket extend along the front and rear sides of the stem, to which they are secured by rivets, with the upper ends of the strap-like ends of the sockets entering countersunk portions of the stale or stem, into which they are forced and held by the rivets so that, initially at least, no ends of the socket will project beyond the stale so as to engage and injure the hands of the shovel user.

Such constructions are useful but they do not go far enough in usefulness in that when such shovels are used, for example, for the prying up of heavy or resisting material and for the lifting of heavy loads the socket straps are loosened at the front or rear sides of the stale or stem, or both of them, with the result that the shovel is liable to breakage or, if not, to injure the hand of the user, which is equally objectionable.

This connection of the socket with the stem or stale of the shovel is the one in common use but it is inefficient for the purpose of avoiding breakage or injury to the hands of the user at what is recognized as the weakest point in the make-up of the shovel, namely, between the socket and stem or stale.

It is the object of the present invention to overcome these difficulties or objections and to do so by such a strengthening of this weakest point as that loosening of the socket connection with the shovel stem or stale will be avoided so that even in prying up of resisting material or in the raising up of heavy material by the shovel blade, there will be no loosening of the socket and stem and therefore no liability of breakage of the shovel or injury to the hands of the user.

In the accompanying drawings,—

Figure 1 is a perspective view of a portion of a shovel embodying the present invention, which resides in the provision of a two-part reinforcing or strengthening casing on the shovel stem or stale in proximity to the shovel socket.

Figure 2 is a side view of the same, on an enlarged scale, with the shovel blade omitted.

Figure 3 is a perspective view of one of the two parts of the reinforcing casing.

Figure 4 is an end view of the two parts of the casing assembled and ready for interlocking.

Figure 5 is a similar view with the two parts of the casing partially interlocked.

Figure 6 is a similar view of the casing completely interlocked except for such changes as may occur during its application to the stem or stale of the shovel.

Figure 7 is a cross-section of the shovel stem and socket on the line 7—7 of Figure 2 showing the casing applied to the shovel stem or stale; and Figure 8 is a perspective view of that portion of the shovel stem which is designed to receive the reinforcing casing and before the application thereto of the latter.

Referring to said drawings, A represents the stale of the shovel, B the blade thereof, and C the socket which is integral with the blade B or rigidly connected therewith by welding, riveting or otherwise, this socket being split longitudinally, as indicated in Figure 1, so that the two straps thereof will extend longitudinally of the stem or stale along the front and rear sides thereof, respectively. So far as these features or members are concerned, the shovel is of an ordinary well-known construction.

In such shovels consisting of these three features or elements the weak spot is at the junction or connection between the stale and blade, or, in other words, at the socket C, and at this point, particularly if the shovel be used for prying resisting material or lifting heavy loads, the socket C is liable to be loosened or broken away from the stale with the result, in either case, that the socket is likely to injure the hands of the user or if broken away render the shovel useless.

The shovel shown, however, includes another member, namely, a two-part casing D to envelope the socket end of the stale or stem A so as to strengthen the shovel against the loosening or breakage of the socket connection between it and the blade just referred to.

This casing D is, as above indicated, made in two parts, each of which is like that shown in Figure 3, that is to say, substantially semi-circular in cross-section and having at one longitudinal edge a hook-like flange $d'$ and at the opposite edge a plain flange $d^2$. The flanges $d'$, $d^2$ in one of the two parts of the casing are arranged as shown in Figure 3, while such flanges are reversed in the other part of the casing so that when the two parts are brought together the flange $d'$ on one part of the casing will engage the plain flange $d^2$ on the other part of the casing, as shown in Figure 4.

In the construction of this casing, and preliminary to its application to the stale or stem, the two parts of the casing are assembled as shown in Figure 4. It should be noted here that at its lower end each of the two casing members is provided with a substantially inverted V-shaped countersunk portion $d^3$ for the reception of the correspondingly shaped upper ends of the socket members C, as hereinafter more fully described.

Then the casing members are first formed as shown in Figure 5 and finally as shown in Figure 6, in which condition the casing D is ready for application to the stem or stale, with the flanges $d'$, $d^2$ of the two parts of the casing interlocked so as to form in the casing diagrammatically opposite double seams E.

The internal diameter of the casing D, as shown in Figure 6 for example, is slightly larger than the diameter of the stem or stale A, as the latter is shown for example in Figure 8, so that the casing may be readily slid along the stale or stem to the position thereon which it is to occupy in proximity to the socket. When thus positioned upon the stale or stem the casing is pressed inwardly into intimate contact with it, with the upper ends of the socket members C resting in the countersunk portions $d^3$ of the casing, as shown in Figures 1, 2, and 7, the casing D, socket members C, and the stale A being then rigidly secured together by a rivet F, as shown in Figures 2 and 7, with the double seams E at the sides of the stale or stem A. This makes a very strong connection between the stale and blade, effectively resisting any tendency of the socket and stale to loosen relatively to each other or to separate and thereby break the connection between the stem and the blade.

This strengthening is further increased by providing longitudinal grooves G in the stale, into which the double seams E are forced when the casing D is pressed into intimate contact with the stale, the provision of the grooves G having a further advantage of avoiding the projection of these double seams beyond the body of the casing which, if permitted, might render the shovel uncomfortable to the hands of the user and possibly injure them.

Preferably the flanges $d'$, $d^2$ do not extend the entire length of the casing members D but terminate at a substantial distance therefrom. The reason for this is to provide for forcing the ends H of the casing members D into intimate contact or engagement with the stale A and into close proximity to each other so as to prevent the entry of moisture, dirt, etc., into the grooves G.

As a further means of providing for intimate interlocking of the casing D with the stale A an additional rivet I may be provided at the upper end of the casing D.

The two parts of the casing D are of pressed steel to provide for the assemblage and formation thereof into the construction shown in Figure 6, preliminary to the application of the casing to the stale or stem, and for the pressing of the casing into intimate contact or engagement with the stale and the forcing of the double seams E thereof into the grooves G of the stem.

Although the blade B shown in the drawing is a solid structure, the word blade as used herein and in the claims is intended to include tined structures, such as forks, the tines in which constitute a blade considered singly or collectively.

What I claim is:

1. A shovel or other implement comprising a blade, a stale, a socket connecting the two and extending upwardly along the stale, and a pressed steel casing in two parts encircling and pressed into intimate engagement with the stale in proximity to the socket and with the side edges of its two parts overlapping each other and interlocked to form double seams at the sides of the stale.

2. A shovel or other implement comprising a blade, a stale, a socket connecting the two and extending upwardly along the stale, and a pressed steel casing in two parts encircling and pressed into intimate engagement with the stale in proximity to the socket and with the side edges of its two parts overlapping each other and interlocked to form double seams at the sides of the stale, the stale being provided with longitudinal grooves into which the double seams are forced.

3. A shovel or other implement comprising a blade, a stale, a socket connecting the two with its ends extending upwardly along the front and rear faces of the stale, and a pressed steel casing in two parts encircling and pressed into intimate engagement with the stale in proximity to the socket and with the side edges of its two parts overlapping each other and interlocked to form double seams at the sides of the stale, the ends of the socket overlying the lower ends of the two parts of the casing, which latter ends are provided with countersunk portions receiving the upwardly extending ends of the socket.

4. A shovel or other implement comprising a blade, a stale, a socket connecting the two with its ends extending upwardly along the front and rear faces of the stale, and a pressed steel casing in two parts encircling and pressed into intimate engagement with the stale in proximity to the socket and with the side edges of its two parts overlapping each other and interlocked to form double seams at the sides of the stale, the ends of the socket overlying the lower ends of the two parts of the casing which latter ends are provided with countersunk portions receiving the upwardly extending ends of the socket and the overlying portions of the socket and casing being riveted together and to the stale.

LEWIS E. WEBSTER.